United States Patent
Wilusz et al.

(10) Patent No.: US 10,087,973 B2
(45) Date of Patent: Oct. 2, 2018

(54) U-CLIP ASSEMBLY

(71) Applicants: John Wilusz, Hamilton (CA); Bradley S. Axelson, Lake Orion, MI (US)

(72) Inventors: John Wilusz, Hamilton (CA); Bradley S. Axelson, Lake Orion, MI (US)

(73) Assignee: A. RAYMOND ET CIE, Grenoble (FR)

( * ) Notice: Subject to any disclaimer, the term of this patent is extended or adjusted under 35 U.S.C. 154(b) by 139 days.

(21) Appl. No.: 15/071,720

(22) Filed: Mar. 16, 2016

(65) Prior Publication Data

US 2017/0268559 A1    Sep. 21, 2017

(51) Int. Cl.
*F16B 37/02* (2006.01)
*F16B 37/04* (2006.01)

(52) U.S. Cl.
CPC ................................. *F16B 37/043* (2013.01)

(58) Field of Classification Search
CPC ...................................................... F16B 37/04
USPC ................. 411/170, 172–175, 125, 523–525
See application file for complete search history.

(56) References Cited

U.S. PATENT DOCUMENTS

| | | | |
|---|---|---|---|
| 2,328,757 A | 9/1943 | Tinnerman | |
| 2,390,750 A | 12/1945 | Tinnerman | |
| 2,459,953 A | 1/1949 | Mills | |
| 2,552,782 A * | 5/1951 | Hall | F16B 37/043 16/441 |
| 2,689,992 A | 9/1954 | Flora | |
| 2,771,113 A | 11/1956 | Flora | |
| 2,873,496 A | 2/1959 | Elms | |
| 2,883,228 A | 4/1959 | Roberts, Jr. | |
| 2,974,703 A | 3/1961 | Rapata | |
| 2,982,324 A | 5/1961 | Zerhan, Jr. | |
| 3,156,282 A | 11/1964 | Bedford, Jr. | |
| 3,182,367 A * | 5/1965 | Hamann | F16B 5/06 16/412 |

(Continued)

FOREIGN PATENT DOCUMENTS

| | | |
|---|---|---|
| DE | 4301975 C1 | 10/1993 |
| DE | 19633203 A1 | 2/1998 |

(Continued)

OTHER PUBLICATIONS

International Search Report dated Jul. 11, 2017 (PCT/IB2017/000320).

*Primary Examiner* — Gary W Estremsky
(74) *Attorney, Agent, or Firm* — Dickinson Wright PLLC

(57) ABSTRACT

A U-clip assembly for a securing a component to an edge of a panel having an aperture therethrough. The U-clip assembly includes a U-shaped body with a back support member and a front support member each extending transversely from a base for straddling the edge of the panel. A cylinder extends from a lower surface of the base and together definite a first bore for threadedly receiving a screw. The back support member defines a retaining tab for engaging the aperture of the panel. The front support member defines a pair of slots to define a central portion therebetween and two outer portions with the central portion extending to a blade for engaging a face of the panel to secure the body thereupon and with each of the outer portions defining secondary clamping members for engaging the same face of the panel and further secure the body thereupon.

20 Claims, 5 Drawing Sheets

(56) References Cited

U.S. PATENT DOCUMENTS

| | | | |
|---|---|---|---|
| 3,364,535 A | 1/1968 | Metcalf | |
| 3,585,333 A | 6/1971 | Valle | |
| 3,869,760 A * | 3/1975 | Meyer | F16B 2/245 |
| | | | 24/562 |
| 4,595,325 A * | 6/1986 | Moran | F16B 37/043 |
| | | | 411/173 |
| 4,606,688 A * | 8/1986 | Moran | B60Q 1/0433 |
| | | | 411/175 |
| 6,629,809 B2 * | 10/2003 | Vassiliou | F16B 37/02 |
| | | | 411/173 |
| 7,243,400 B2 * | 7/2007 | Boville | F16B 5/0241 |
| | | | 24/290 |
| 7,874,775 B2 * | 1/2011 | Hullmann | B60R 11/00 |
| | | | 24/295 |
| 8,087,862 B1 | 1/2012 | Smith | |
| 8,388,289 B2 * | 3/2013 | Mazur | F16B 37/043 |
| | | | 411/112 |
| 8,790,056 B2 * | 7/2014 | Fuentes Domingo | |
| | | | F16B 37/043 |
| | | | 411/173 |
| 2011/0243685 A1 | 10/2011 | Mazur | |
| 2012/0274094 A1 | 11/2012 | Mazur et al. | |

FOREIGN PATENT DOCUMENTS

| | | |
|---|---|---|
| DE | 19633203 C2 | 5/1999 |
| EP | 0778420 A1 | 6/1997 |
| FR | 2898945 A1 | 9/2007 |

\* cited by examiner

U-CLIP ASSEMBLY

BACKGROUND OF THE INVENTION

1. Field of the Invention

A U-clip assembly for a securing a component to an edge of a panel.

2. Discussion

U-clip assemblies are used in various industries, including the automotive industry, to retain edges of panels to other components. For example, a U-clip assembly may be used to retain a door trim panel to an edge of a supporting metal sheet of the door.

SUMMARY OF THE INVENTION

The invention provides for a U-clip assembly for securing a component to an edge of a panel. The U-clip assembly includes a body of generally U-shape including a base with a back support member and a front support member extending transversely therefrom for straddling the edge of the panel, and wherein the base includes a lower surface disposed between the support members. The base defines a first bore between the support members for receiving a fastener for securing the component. The back support member includes a retaining tab extending toward the base for engaging the panel to secure the U-clip assembly thereupon. The front support member includes a wall portion extending from the base and defines a pair of sides in spaced and parallel relationship to one another, and a pair of slots extending parallel to and spaced from the sides to define a central portion therebetween, and an outer portion outwardly of each of the slots. The central portion defines a primary clamping member extending generally toward the base and away from the wall portion to a blade for engaging the first face of the panel to secure the U-clip assembly thereupon.

The invention in its broadest aspect therefore provides for U-clip assembly that can be installed on an edge of a panel with a low insertion force, preferably below 45 N, and provides a high retention force, preferably above 900 N. The invention also provides for a U-clip assembly that, in the single action of inserting a fastener, secures the fastener to the U-clip assembly, biases the primary clamping member into the first face of the panel to secure the U-clip assembly thereupon, and indirectly increases the clamping force between the secondary clamping members and the first face of the panel.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
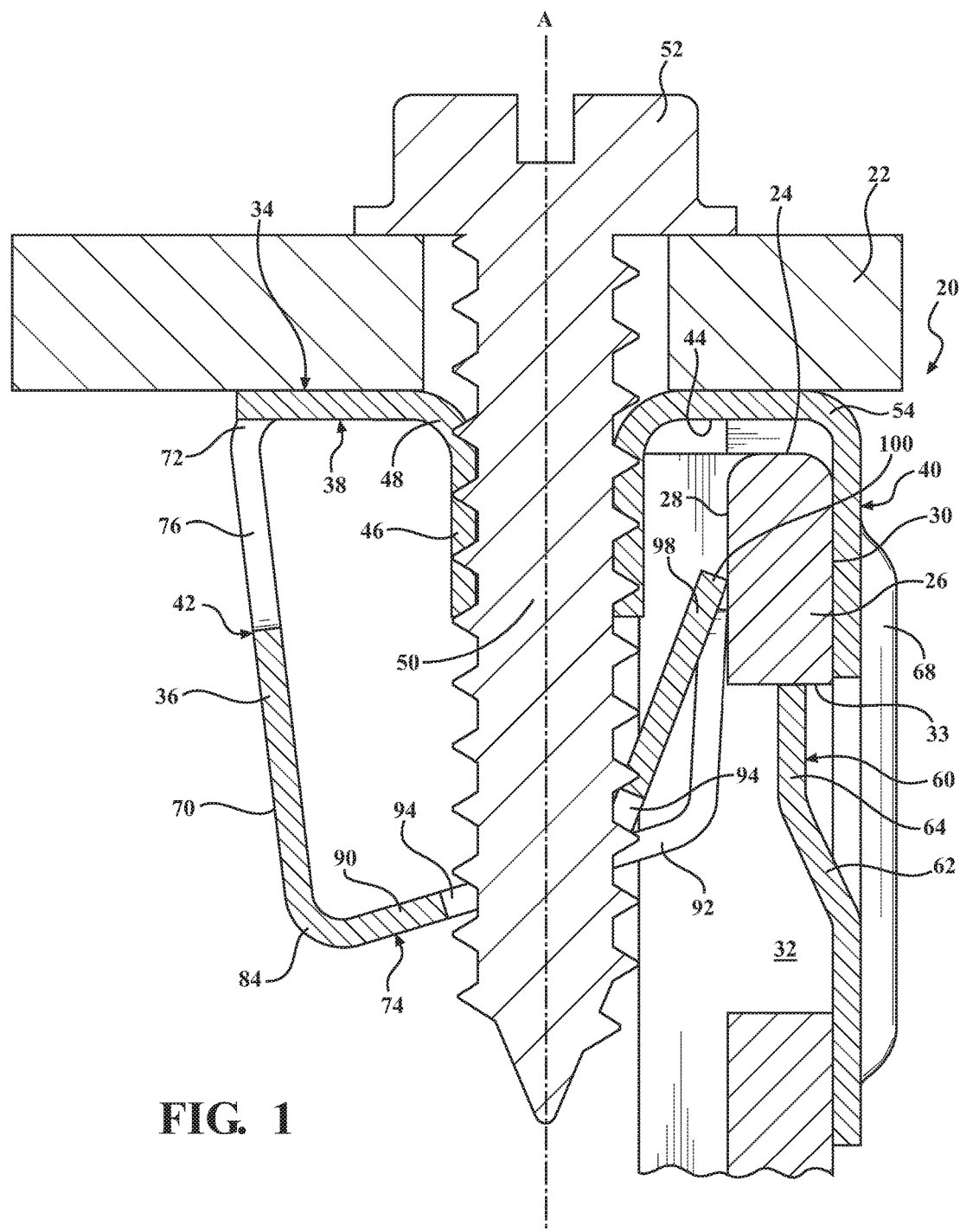
FIG. 1 is a cut-away side view of the preferred embodiment of the subject U-clip assembly securing a component to an edge of a panel.

Referring to the Figures, wherein like numerals indicate corresponding parts throughout the several views, a U-clip assembly 20 is generally shown for a securing a component 22 to an edge 24 of a panel 26 having a first face 28 and a second face 30 and an aperture 32 extending between the faces 28, 30 and defining a rim 33 opposite the edge 24. The U-clip assembly 20 includes a body 34 of generally U-shape including a base 38 having a generally rectangular shape and a back support member 40 and a front support member 42. The support members 40, 42 each extend transversely from the base 38 and are generally parallel to one other for straddling the edge 24 of the panel 26, and the base 38 includes a lower surface 44 between the support members 40, 42. The body 34 of the U-clip assembly 20 extends between a pair of sides 36 in spaced and parallel relationship to one another.

As shown in FIG. 1, a cylinder 46 extends from the lower surface 44 along an axis A perpendicular to and centered on the base 38 between the support members 40, 42. A collar 48 having a generally frustoconical shape is disposed between the base 38 and the cylinder 46 along the axis A. It should be appreciated that collar 48 could be formed with any taper or that the cylinder 46 may extend directly from the lower surface 44 without a collar 48 therebetween. The base 38, the cylinder 46, and the collar 48 together define a first bore 50 that has threads extending therethrough for threadedly receiving a fastener, which may be a screw 52.

Figure 4:
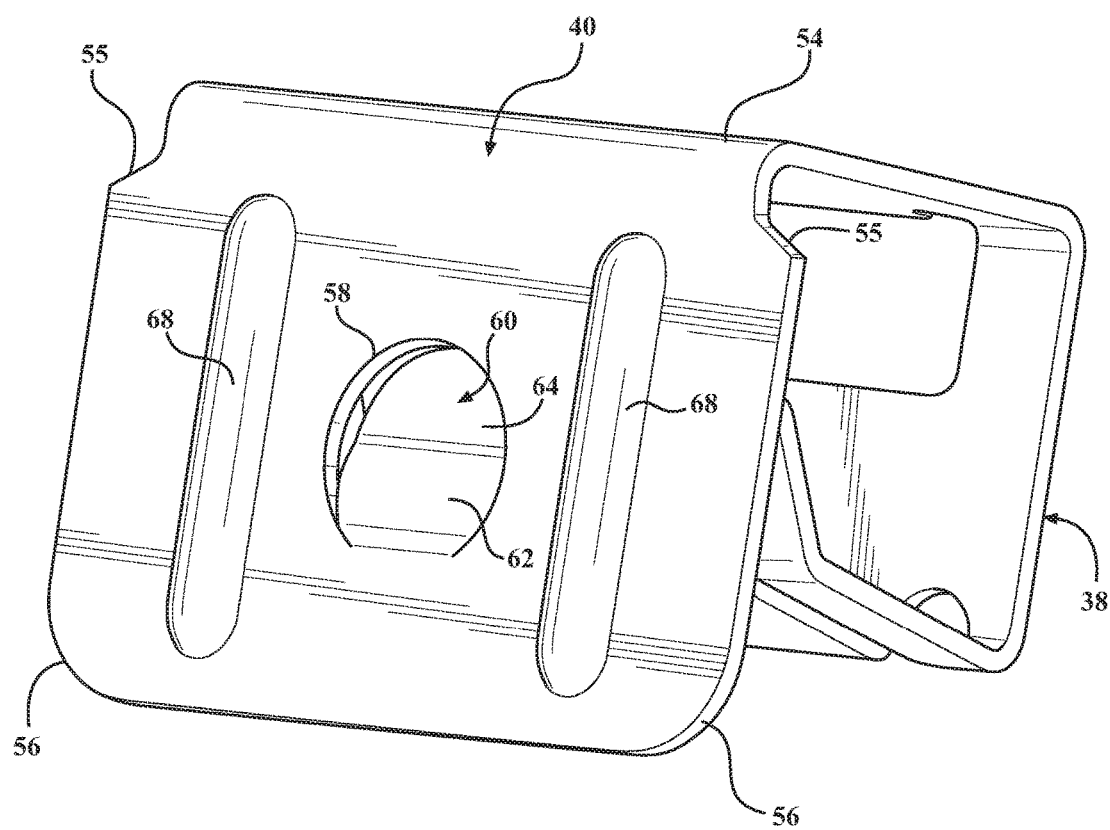
FIG. 4 is a perspective view of the preferred embodiment of the subject U-clip assembly.

As best shown in FIG. 4, the back support member 40 has a generally rectangular shape and extends perpendicularly from the base 38 along a first bend 54 for engaging the second face 30 of the panel 26. The back support member 40 defines a pair of shoulders 55 extending outwardly and away from the base 38 and a pair of rounded corners 56 opposite the base 38. The back support member 40 also includes a pierced portion 58 centered thereupon with a generally circular shape to define a retaining tab 60 having an angled portion 62 extending from the back support member 40 toward the base 38 for engaging the edge 24 of the panel 26 when the U-clip assembly 20 is installed thereon. A pair of stiffening ribs 68 protrude outwardly from the back support member 40 opposite the base 38 and extending parallel to the sides 36 and flanking the retaining tab 60.

Figure 2:
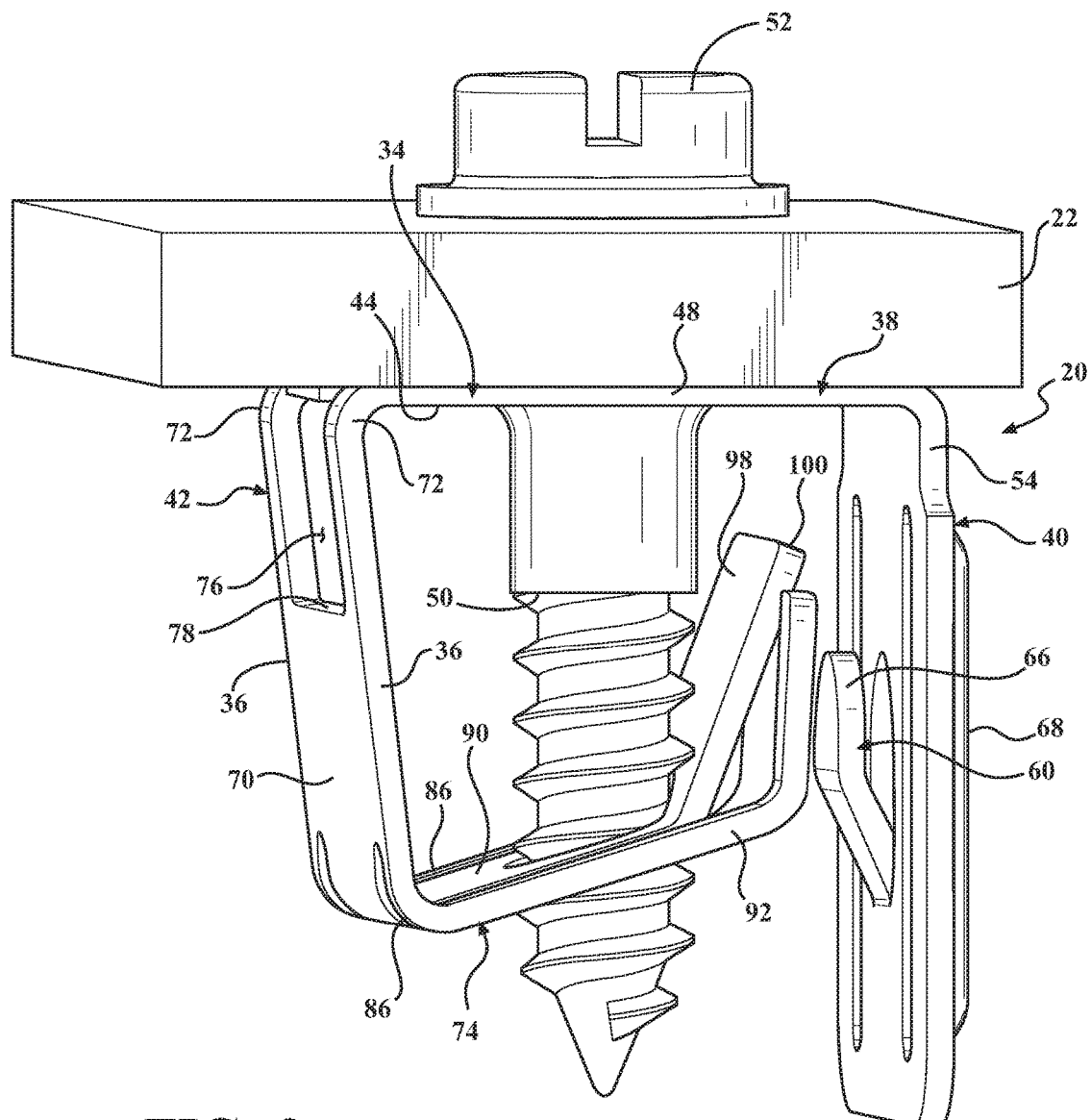
FIG. 2 is a perspective view of the preferred embodiment of the subject U-clip assembly securing a component to an edge of a panel.

As shown in FIG. 2, the retaining tab 60 continues beyond the angled portion 62 to an upper portion 64 that extends parallel to the back support member 40 toward the base 38 and defines a top 66 having an arched shape for engaging the rim 33 of the aperture 32 of the panel 26 to secure the U-clip assembly 20 thereupon and provide a retention force in opposition to a pulling force on the screw 52.

As best illustrated in FIG. 1, when the U-clip assembly 20 is installed on the panel 26, the retaining tab 60 is bent outwardly by the engagement of the angled portion 62 with the edge 24 of the panel 26. When the U-clip assembly 20 is positioned with the upper portion 64 of the retaining tab 60 overlying the aperture 32 of the panel 26, the retaining tab 60 will snap back inwardly to its natural position with an audible "click," which can signal that the U-clip assembly 20 is in position on the panel 26 for operable use.

Figure 3:
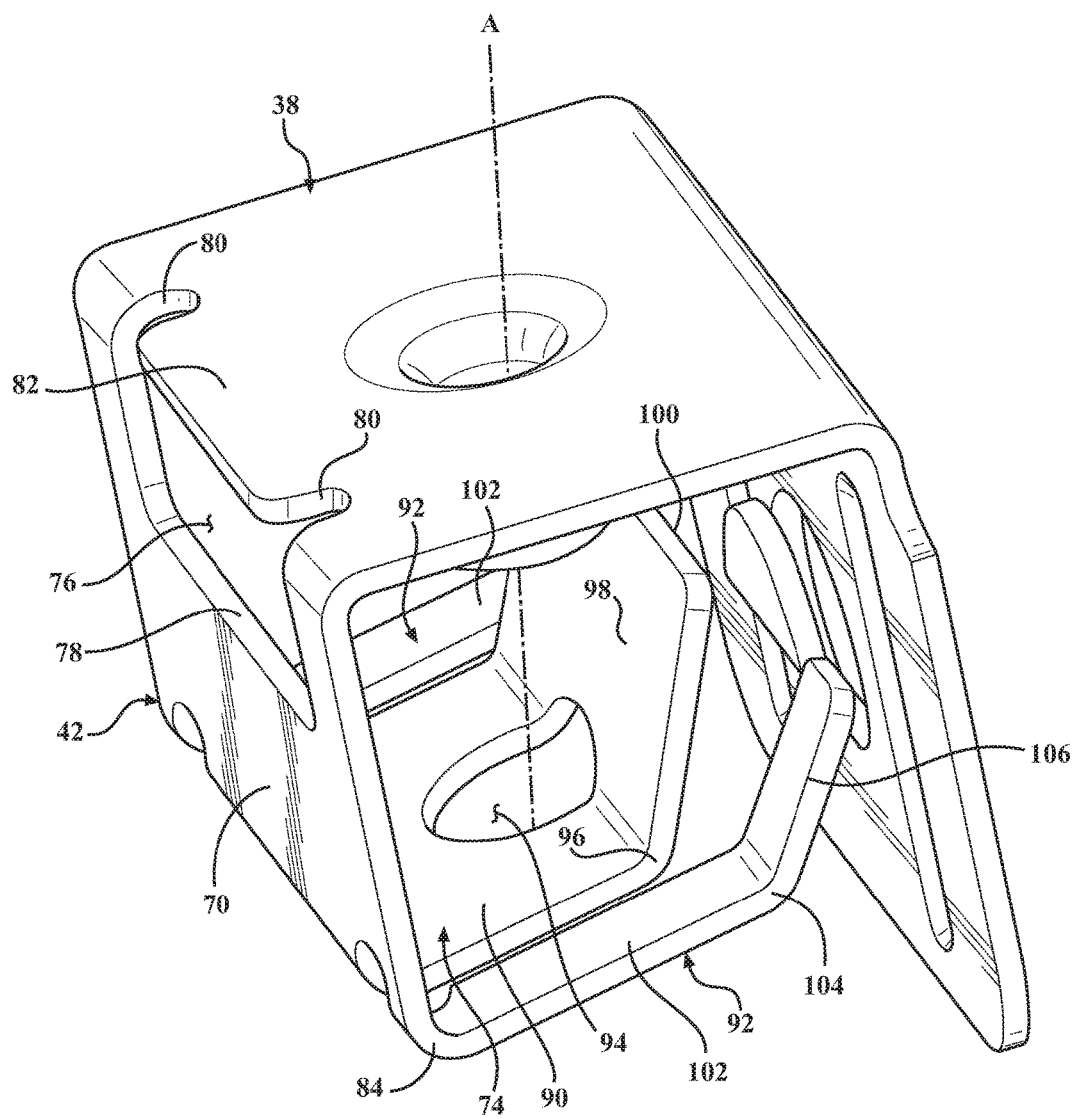
FIG. 3 is a perspective view of the preferred embodiment of the subject U-clip assembly.

FIG. 2 also shows the front support member 42 including a wall portion 70 that extends generally perpendicularly from the base 38 along a second bend 72 to a floor 74 opposite the base 38. FIG. 3 shows a first hole 76 disposed in the wall portion 70 centrally between the sides 36 and extending from the second bend 72 to a lower end 78 between the base 38 and the floor 74. The base 38 includes a notch 80 proximate to each of the sides 36 and adjoining the first hole 76 to define a ledge 82 on the base 38 therebetween.

Figure 5:
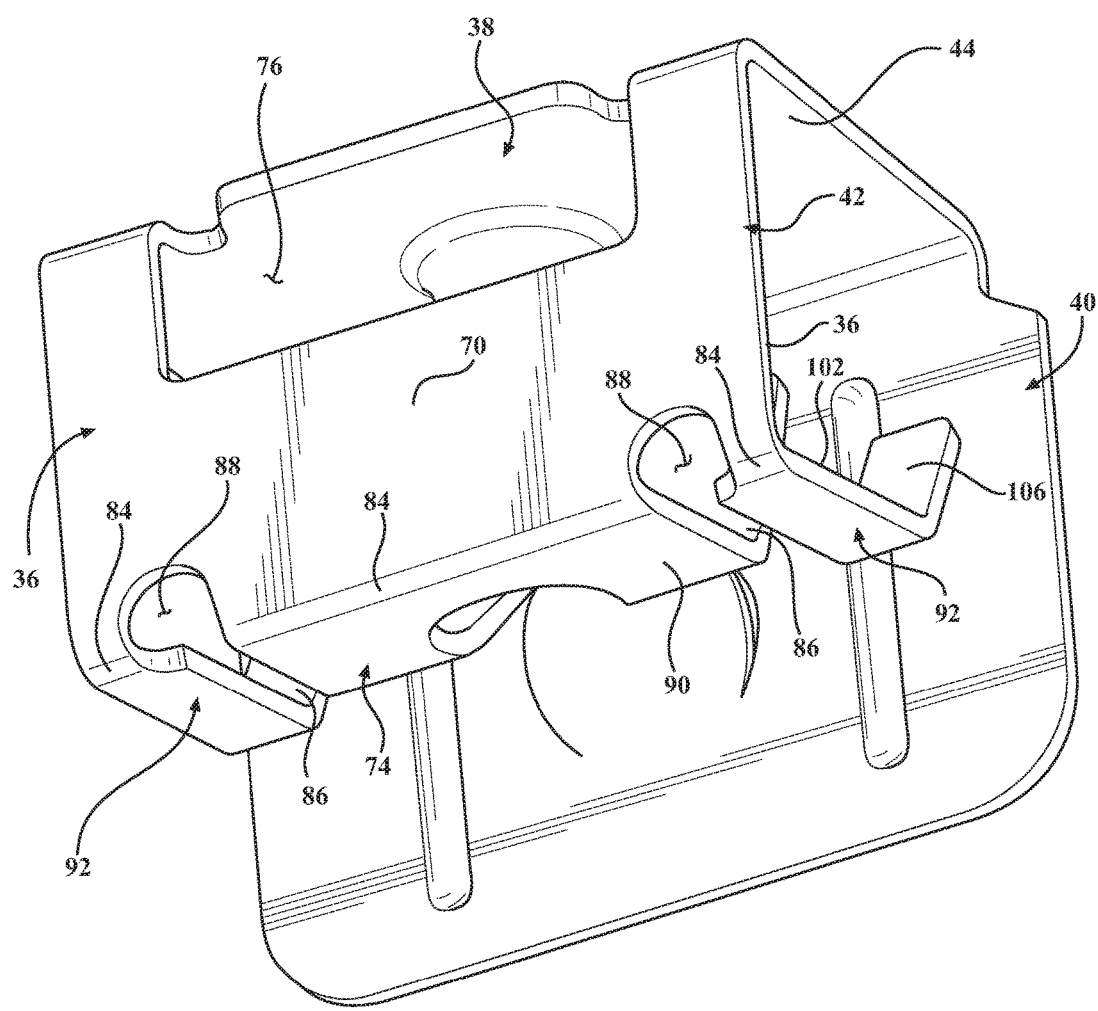
FIG. 5 is a perspective view of the preferred embodiment of the subject U-clip assembly.

FIG. 5 shows the floor 74 extending from a third bend 84 toward the back support member 40 between the sides 36 and generally perpendicularly to the wall portion 70 of the front support member 42. The wall portion 70 defines a pair of second holes 88 each having a circular shape and located adjacent the third bend 84 and the sides 36. The front support member 42 defines a slot 86 extending from each of the second holes 88 parallel to and spaced from the sides 36 through the floor 74 to define a central portion 90 therebetween and an outer portion 92 outwardly of each of the slots 86.

FIG. 3 shows the central portion 90 defining a second bore 94 centered thereupon having a circular shape for receiving the screw 52. Further, a fourth bend 96 extends thereacross to define a primary clamping member 98 extending at an obtuse angle toward the base 38 and away from the wall portion 70 to a blade 100 spaced and parallel to the base 38 and the front support member 42 for engaging the first face 28 of the panel 26 to secure the U-clip assembly 20 thereupon.

As shown in FIG. 1, the primary clamping member 98 partially overlaps the second bore 94 in the central portion 90 of the floor 74 for engaging the screw 52 and biasing the primary clamping member 98 into engagement with the first face 28 of the panel 26 and to increase the securement force therebetween and for providing a prevailing torque to hold the screw 52 with the body 34 and preventing the screw 52 from loosening prematurely. Engagement between the screw 52 and the primary clamping member 98 also causes wall portion 70 to flex outwardly and thereby causes the secondary clamping member 106 to apply an increased clamping force against the first face 28 of the panel 26.

FIG. 3 shows each of the outer portions 92 including a straight portion 102 extending along the floor 74 beyond the fourth bend 96 to a fifth bend 104 thereacross to define a secondary clamping member 106 extending at an obtuse angle generally toward the base 38 and away from the wall portion 70 for engaging the first face 28 of the panel 26 to further secure the U-clip assembly 20 thereupon.

The secondary clamping may also function to align the U-clip assembly 20 during installation on the panel 26. It may also hold the U-clip assembly 20 in place on the panel 26 when the screw 52 is not in place to bias the primary clamping member 98 into engagement with the first face 28 of the panel 26.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A U-clip assembly for securing a component to an edge of a panel having a first face, said U-clip assembly including:

a body of generally U-shape including a base and a back support member and a front support member wherein said base includes a lower surface disposed between said support members that extend transversely therefrom for straddling the edge of the panel, said base defining a first bore between said support members for receiving a fastener, said back support member including a retaining tab extending toward said base for engaging the panel to secure said U-clip assembly thereupon, said front support member including a wall portion extending from said base, said front support member defining a pair of sides in spaced and parallel relationship to one another and a pair of slots extending parallel to and spaced from said sides to define a central portion therebetween and an outer portion outwardly of each of said slots, and said central portion defining a primary clamping member extending generally toward said base and away from said wall portion to a blade for engaging the first face of the panel to secure said U-clip assembly thereupon; and wherein said central portion intersects an axis extending through said first bore and perpendicular to said base.

2. A U-clip assembly as set forth in claim 1 further including each of said outer portions defining a secondary clamping member extending generally toward said base for engaging the first face of the panel to further secure said U-clip assembly thereupon.

3. A U-clip assembly as set forth in claim 1 further including said central portion defining a second bore centered thereupon for receiving said fastener.

4. A U-clip assembly as set forth in claim 3 further including said primary clamping member partially overlapping said second bore for engaging said fastener and biasing said primary clamping member into engagement with the first face of the panel and to increase the securement force therebetween and for holding said fastener with said body to prevent premature loosening.

5. A U-clip assembly as set forth in claim 1 further including said back support member including a pierced portion to define said retaining tab.

6. A U-clip assembly as set forth in claim 1 wherein said retaining tab includes an angled portion extending from said back support member toward said base for engaging the edge of the panel when said U-clip assembly is installed thereon.

7. A U-clip assembly as set forth in claim 6 further including an upper portion that extends beyond said angled portion of said retaining tab and parallel to said back support member toward said base.

8. A U-clip assembly as set forth in claim 7 further including said upper portion of said retaining tab defining a top having an arched shape for engaging an aperture of the panel.

9. A U-dip assembly as set forth in claim 1 further including a cylinder extending from said lower surface along an axis perpendicular to and centered on said base.

10. A U-clip assembly as set forth in claim 9 further including a collar having a frustoconical shape disposed between said lower surface of said base and said cylinder and extending along said axis.

11. A U-clip assembly as set forth in claim 1 wherein said first bore has threads extending therethrough for threadedly receiving a fastener.

12. A U-clip assembly as set forth in claim 1 further including a stiffening rib protruding outwardly from said back support member opposite said base.

13. A U-clip assembly as set forth in claim 1 further including said back support member extending from said base along a first bend.

14. A U-clip assembly as set forth in claim 1 further including said wall portion of said front support member extending from said base to a floor.

15. A U-clip assembly as set forth in claim 14 further including a second bend between said base and said wall portion of said front support member and said floor extending generally perpendicularly from said wall portion along a third bend opposite said base and toward said back support member between said sides.

16. A U-clip assembly as set forth in claim 14 further including a first hole disposed in said wall portion centrally between said sides and extending from said base to a lower end between said base and said floor.

17. A U-clip assembly as set forth in claim 16 further wherein said base defines a notch proximate to each of said sides and adjoining said first hole to define a ledge therebetween.

18. A U-clip assembly as set forth in claim 1 further including said central portion including a fourth bend thereacross to define said primary clamping member.

19. A U-clip assembly as set forth in claim 18 wherein each of said outer portions includes a straight portion extending beyond said fourth bend to a fifth bend thereacross to define a secondary clamping member that extends generally toward said base for engaging the first face of the panel to further secure said U-clip assembly thereupon.

20. An assembly as set forth in claim 1 further including said back support member defining a pair of shoulders extending outwardly and away from said base and a pair of rounded corners opposite said base.

\* \* \* \* \*